Figure 1:
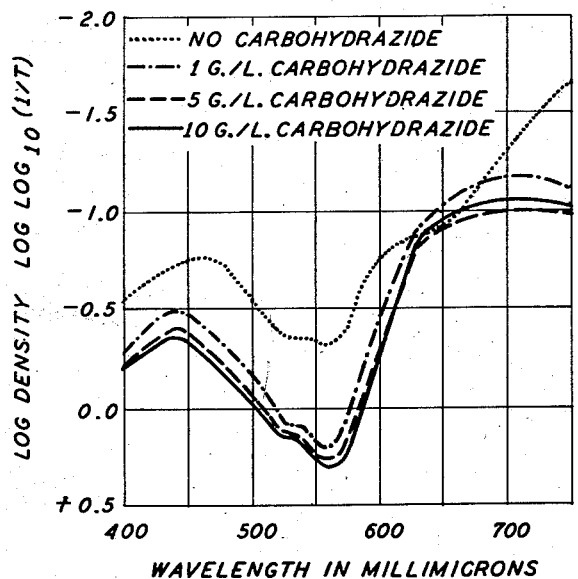

Dec. 4, 1956  J. W. BRITAIN  2,772,973
STABILIZED COLOR DEVELOPERS
Filed Feb. 2, 1955  2 Sheets—Sheet 1

INVENTOR
J. W. BRITAIN
BY
ATTORNEYS

United States Patent Office 2,772,973
Patented Dec. 4, 1956

2,772,973

STABILIZED COLOR DEVELOPERS

J W Britain, Binghamton, N. Y., assignor to General Aniline & Film Corporation, New York, N. Y., a corporation of Delaware Application February 2, 1955, Serial No. 485,756

5 Claims. (Cl. 96—55)

The present invention relates to stabilized photographic color developers and more particularly to such developers in which stabilization has been effected by the utilization of the reaction product of carbohydrazide with an alkali metal carbonate or bicarbonate.

Color developers as presently recommended for use are either of the p-phenylenediamine or of the 2,4-diaminoaniline type. The p-phenylenediamines, such as p-diethylaminoaniline, p-dimethylaminoaniline, p-N-hydroxyethylaminoaniline, p - N - dihydroxyethylaminoaniline, are employed if the dye images desired be of the azomethine or quinoneimine class. The 2,4-diaminoanilines, such as 4-(β-hydroxyethylamino)-6-phenylaminometanilic acid, 4,6-di(β-hydroxyethylamino)-metanilic acid and the like (see U. S. P. 2,486,440 to Schmidt and Tulagin and U. S. P. 2,570,116 to Gunther) are employed if the dye images desired be of the azine class.

It is recognized that these color developers, due to the presence therein of a primary amino group which is activated by another amino group in para-position thereto, are quite susceptible to aerial oxidation. This fact has presented a rather serious problem with regard to the storage stability of the developers. The problem is such that numerous efforts have been made to improve the shelf life of the color developers, such as by including components specifically designed to preserve the developers. To this end, it has been suggested to use dextrose, hydroxylamine, p-hydroxyphenylglycine, Rongolite, sodium metaborate and the like. While certain of these compounds, specifically hydroxylamine and sodium metaborate, have a definite stabilizing action, most compounds tested have a deleterious effect on the development properties. This is particularly true with regard to dextrose, p-hydroxylphenylglycine, Rongolite and hydroxylamine. Sodium metaborate, when used as the alkali of an azine type developer, does a rather good job but still leaves something to be desired.

It has now been discovered, rather surprisingly, that the susceptibility of color developers to aerial oxidation can be considerably minimized by the utilization of the reaction product of carbohydrazide with an alkali metal carbonate, on the one hand, or an alkali metal bicarbonate, on the other hand. Color developers of the p-phenylenediamine and 2,4-diaminoaniline class, containing such reaction products as stabilizers, and the utilization of such developers constitute the purposes and objects of the present invention.

Carbohydrazide, which has the following formula:

NH₂.NH.CO.NH.NH₂ is a product available on the open market and one which in any case can be prepared according to page 32, vol. 4 of Inorganic Syntheses. U. S. P. 2,419,975, Trivelli et al., recommends this compound, among others, for addition to silver halide emulsions or certain photographic developers to obtain an increase in speed and contrast of the emulsions. The developers with which the patentee is concerned, however, are of the phenolic type, i. e., black and white developers, and this is evident from lines 70 et seq., column 6 of the patent. It will be subsequently shown that increased stability is not a factor when the carbohydrazide derivatives are incorporated in developers of the phenolic type.

The quantity of stabilizer necessary to minimize aerial oxidation may vary over a wide range, and, in this connection, it may be noted that I have obtained effective results with as little as 0.1 gram per liter of developer solution and as much as 20 grams per liter. The higher concentration within this range gave best protection.

It was ascertained that when carbohydrazide is added to a color developer containing an alkali metal carbonate, such as sodium carbonate, potassium carbonate or the like, the carbohydrazide reacts with the carbonate ion to produce a compound, as yet unidentified, which has the same ability as the carbohydrazide to act as a color developer stabilizer. Such reaction is evidenced by a marked shift in the pH of the developer solution to the alkaline side. Further experiments proved that the same or a similar reaction takes place between carbohydrazide and an alkali metal bicarbonate, such as sodium bicarbonate, potassium bicarbonate and the like.

It will be evident from what has been stated that when the carbohydrazide is added to carbonate containing developers, the aforesaid reaction product is the effective stabilizer. It is equally evident that if it be desired to utilize such reaction product as the stabilizer for developers free from carbonate, such as those in which the alkali is provided by sodium metaborate, trisodium phosphate or the like, the reaction product may be preformed before adding it to the developer. To this end, an aqueous solution of the carbohydrazide and carbonate, preferably with bicarbonate, is allowed to stand at room temperature for at least a day prior to use. Usually the reaction components will be present in the aqueous solution in substantially equimolar proportions or in about equal amounts.

The carbohydrazide reaction products with an alkali metal carbonate or alkali metal bicarbonate are effective stabilizers for any of the previously indicated color developers. This is true with the developers of the p-phenylenediamine class previously mentioned, or of the 2,4-diaminoaniline class also previously illustrated, and exemplified in the aforesaid Schmidt and Tulagin and Gunther patents.

Figure 2:
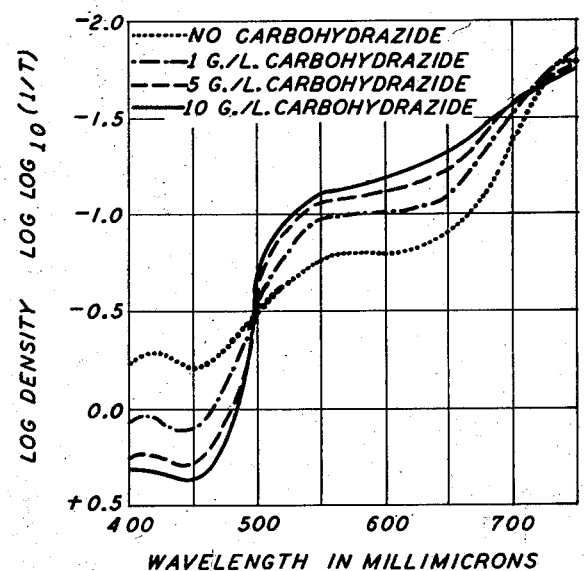
Figure 3:
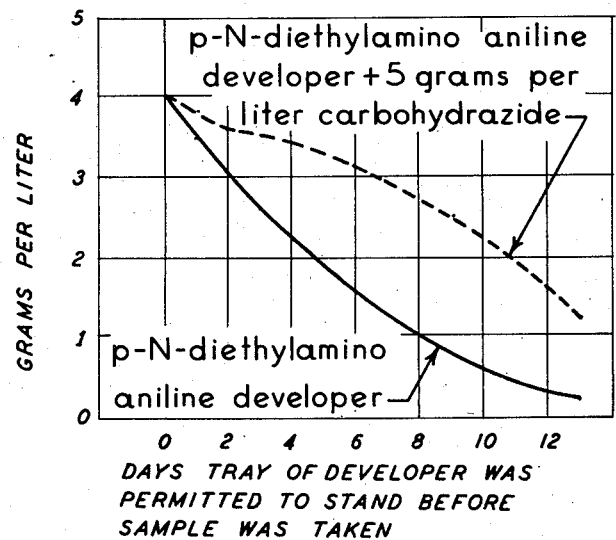
Figure 4:
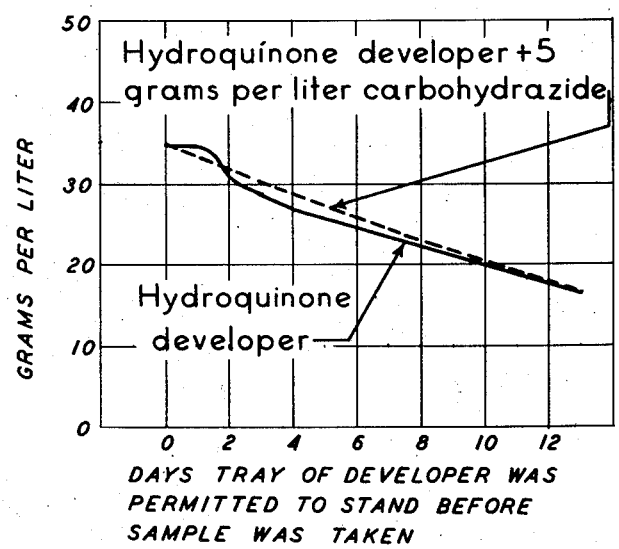

The invention will be further explained by the following examples and the accompanying drawing, Figures 1 and 2 of which represent spectrophotometric curves based on data obtained by color developing light sensitive silver halide emulsions containing color formers with color developers free from and containing the aforesaid carbohydrazide reaction products, Figure 3 is a graph showing the stability of a color developer containing the aforesaid carbohydrazide reaction products, on the one hand, and the same color developer without said reaction products, on the other hand; and Figure 4 is a graph showing the effect on stability of the carbohydrazide reaction products in a hydroquinone developer.

EXAMPLE I

An azine color developer was prepared as follows:

*Part A*

Sodium sulfite _____grams__ 5
4-(β-hydroxyethylamino)-6-phenylamino metanilic acid _____grams__ 5.8
Reaction product of pyruvic acid with 4-(β-hydroxyethylamino) - 6 - phenylamino metanilic acid _____grams__ 2
Water _____cc__ 50

Part B

| | |
|---|---|
| 2-aminopyridine sulfate _____ grams__ | 3 |
| Ethylenediamine tetraacetic acid _____do____ | .75 |
| Sodium sulfite _____do____ | 15 |
| Sodium carbonate (monohydrate) _____do____ | 60 |
| Sodium bromide _____do____ | .86 |
| Sodium sulfate (anhydrous) _____do____ | 100 |
| Trisodium phosphate (anhydrous) _____do____ | 14 |
| Water to make 900 cc. | |

Part C

| | |
|---|---|
| Carbohydrazide _____ grams__ | 5 |
| Sodium carbonate (monohydrate) _____do____ | 5 |
| Sodium bicarbonate _____do____ | 5 |
| Water _____cc__ | 50 |

(Part C solution was allowed to stand for at least one day at room temperature, i. e., about 20° C., before using.)

Parts A, B and C are mixed and the pH adjusted to 10.68 by means of trisodium phosphate or dilute sulfuric acid as the case may be.

This color developer was found to be far more stable to aerial oxidation than a similar developer from which the carbohydrazide had been omitted.

EXAMPLE II

An azine color developer, particularly for reversal development, was prepared as follows:

Part A

| | |
|---|---|
| Ethylenediamine tetraacetic acid _____ grams__ | .75 |
| Sodium sulfite _____do____ | 10 |
| β-Phenylethylamine sulfate _____do____ | 1 |
| Sodium carbonate (monohydrate) _____do____ | 60 |
| Sodium bromide _____do____ | .68 |
| Sodium sulfate _____do____ | 100 |
| Trisodium phosphate _____do____ | 14 |
| Sodium bisulfite _____do____ | 4.63 |
| Water _____cc__ | 800 |

Part B

| | |
|---|---|
| Sodium sulfite _____ grams__ | 5 |
| 4-(β-hydroxyethylamino)-6-phenylamino metanilic acid _____ grams__ | 5.8 |
| Water _____cc__ | 50 |

Part C

| | |
|---|---|
| Carbohydrazide _____ grams__ | 5 |
| Sodium carbonate (anhydrous) _____do____ | 5 |
| Sodium bicarbonate _____do____ | 5 |
| Water _____cc__ | 100 |

(Part C solution was allowed to stand for at least one day at room temperature before using.)

Parts A, B and C are mixed and the pH adjusted to 10.68 while using trisodium phosphate or dilute sulfuric acid as the case may be.

This color developer was found to be far more stable to aerial oxidation than a similar developer from which the carbonhydrazide had been omitted.

EXAMPLE III

An azine color developer was prepared as follows:

| | |
|---|---|
| 6-anilino-4-(2-hydroxyethylamino) metanilic acid _____ grams__ | 5.8 |
| 2-aminopyridine sulfate _____ do____ | 3.1 |
| Sodium sulfite _____do____ | 20 |
| Sodium carbonate (monohydrate) _____do____ | 60 |
| Sodium bromide _____do____ | .86 |
| Sodium sulfate _____do____ | 100 |
| Trisodium phosphate (12 parts water) _____do____ | 13.5 |
| Water to make 1 liter. | |

This solution was divided into four portions, to one of which was added 1 gram per liter of carbohydrazide, to another 5 grams per liter, and to a third 10 grams per liter.

Each of the four solutions (one without carbohydrazide), after standing in an open tank for six days, was used to develop an exposed light sensitive silver bromide emulsion containing a magenta color former, such as described in United States Patent 2,524,725, particularly Compound 4, column 2 thereof.

The results of such development are graphically represented in Figure 1 of the drawing, in which log densities are plotted as ordinates and wavelength in millimicrons as abscissa. It will be self-evident from the graphs of this figure that the aged developers containing carbohydrazide are far more effective than that free from carbohydrazide.

EXAMPLE IV

Each of the four developers of Example III, after standing for six days as noted in Example III, was used to develop an exposed silver bromide emulsion containing as a color former a compound such as disclosed in United States Patent 2,500,487, and particularly that of Example 3.

Figure 2 depicts the results of these tests which are again deemed to be self-explanatory.

EXAMPLE V

A color developer was prepared as follows:

| | |
|---|---|
| Calgon _____ grams__ | 1 |
| Sodium bisulfite _____do____ | 2 |
| p-Diethylaminoaniline _____do____ | 4 |
| Sodium carbonate (monohydrate) _____do____ | 67.5 |
| Potassium bromide _____do____ | 1 |
| Water to make 1 liter. | |

This solution was divided into two portions and to one were added 2.5 grams (5 grams per liter) of carbohydrazide. The two solutions were allowed to stand in an open tray for six days and samples of each were taken each day for analysis of content of active developer ingredient.

The results of this test are illustrated by Figure 3, which establishes that the developer containing carbohydrazide is far more stable to aerial oxidation than that free from carbohydrazide.

It has been previously stated that the carbohydrazide reaction products have been found to have little effect on the stability to aerial oxidation of phenolic developers. The following test was conducted to establish the accuracy of this assertion.

A developer solution was prepared as follows:

| | |
|---|---|
| Hot water (125° F.) _____cc__ | 750 |
| Hydroquinone _____ grams__ | 35 |
| Sodium sulfite _____do____ | 55 |
| Sodium carbonate (monohydrate) _____do____ | 80 |
| Citric acid _____do____ | 5.5 |
| Potassium bromide _____do____ | 10 |
| Water to make _____ 1 liter. | |

This solution was divided into two portions, and to one there were added 2.5 grams (5 grams per liter) of carbohydrazide. The two solutions were stored in open trays and samples of each solution were taken each day for analysis of active ingredient. The results of this test are shown in Figure 4 which establishes that the carbohydrazide has little activity in suppressing air oxidation of phenolic type developers.

Various modifications of the invention will occur to persons skilled in the art and I, therefore, do not intend to be limited in the patent granted except as necessitated by the appended claims.

I claim:

1. A color developer containing as the active color developing principle a primary aromatic amino developing agent and as a stabilizer therefor against air oxidation the reaction product of carbohydrazide with a compound selected from the class consisting of alkali metal carbonates and bicarbonates.

2. The composition as defined in claim 1, wherein the active developing principle is a p-phenylenediamine.

3. The composition as defined in claim 1, wherein the active developing principle is a 2,4-diaminoaniline.

4. The composition as defined in claim 1, wherein the stabilizer is the reaction product of carbohydrazide and sodium carbonate.

5. The composition as defined in claim 1 wherein the stabilizer is present in an amount ranging from .1 gram to 20 grams per liter of the developing solution.

No reference cited.